United States Patent [19]

Olshvang et al.

[11] 4,208,707
[45] Jun. 17, 1980

[54] METHOD AND APPARATUS FOR CONTROL OF STATIC VALVE CONVERTER

[75] Inventors: Mikhail V. Olshvang; Grigory M. Tsfasman, both of Moscow; Alexei A. Sheremet, Mytischi Moskovskoi, all of U.S.S.R.

[73] Assignee: Vsesojuzny Elektrotekhnichesky Institut Imeni V. I. Lenina, Moscow, U.S.S.R.

[21] Appl. No.: 871,957

[22] Filed: Jan. 24, 1978

[51] Int. Cl.$^2$ .......................................... H02M 7/00
[52] U.S. Cl. ........................................ 363/35; 363/96
[58] Field of Search ....................... 363/13, 34, 35, 37, 363/51, 78, 96

[56] References Cited

U.S. PATENT DOCUMENTS 3,582,755  6/1971  Liss et al. .............................. 363/78

Primary Examiner—William M. Shoop
Attorney, Agent, or Firm—Lackenbach, Lilling & Siegel

[57] ABSTRACT

A method for control of a static valve converter consists of determining the difference between the actual and desired control pulse phases by the use of an equidistant pulse sequence, the frequency of which being equal to the coversion frequency, the pulse sequence phase being selected so that the mean difference between the equidistant pulse phase and the phase of the respective control pulses of all valves is equal to zero, and the pulse phase difference being determined for each individual valve. A control pulse automatic balancing unit incorporated in an apparatus for realizing the method of the present invention comprises an equidistant pulse sequence assembly, a shaping element, correcting signal circuits and logical AND elements equal in number to the number of conversion phases, and also logical circuits equal in number to the number of coversion phases. Each logical circuit comprises two logical AND elements, and a logical OR element connected to the outputs of the AND elements.

10 Claims, 29 Drawing Figures

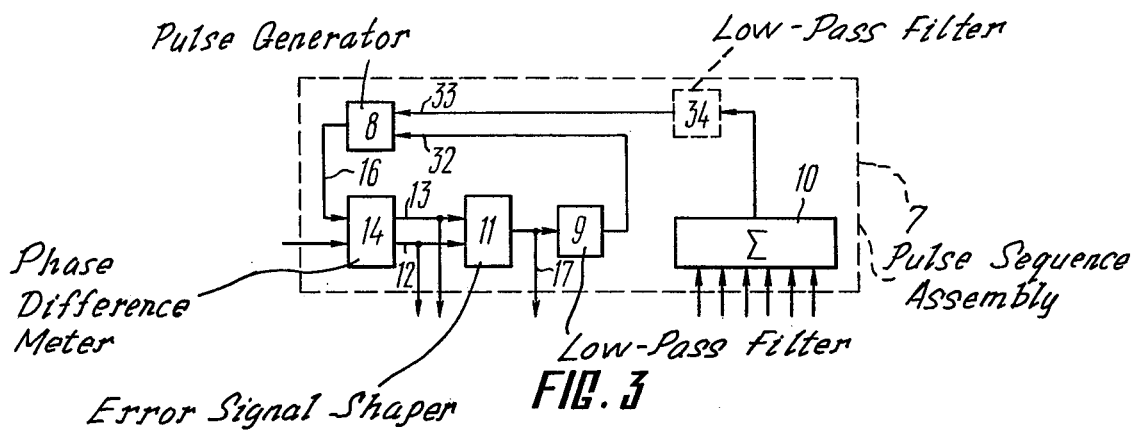
FIG. 3
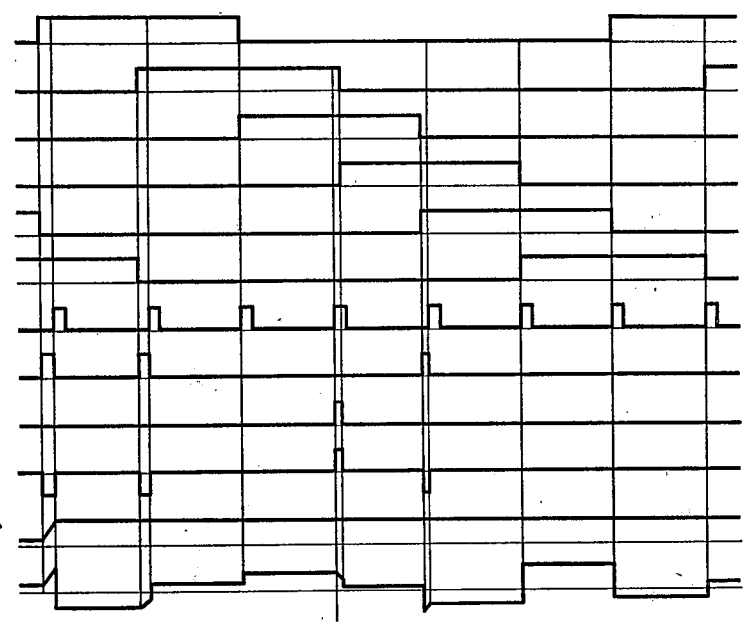

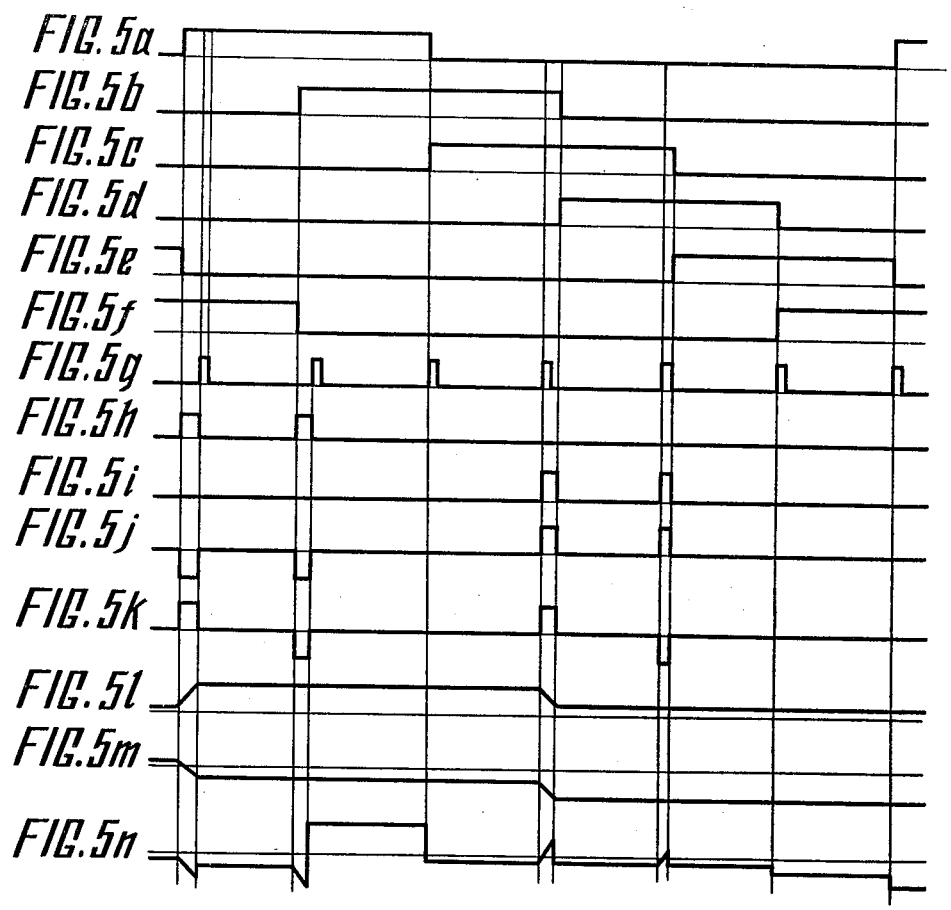

METHOD AND APPARATUS FOR CONTROL OF STATIC VALVE CONVERTER

FIELD OF THE INVENTION

The present invention relates to conversion devices and, more particularly, to methods and apparatuses for control of static gate converters.

The present invention is realized in direct current transmission converter control devices.

The requirements for the efficiency of control of the conversion devices become more stringent with the growth of the power thereof. Among these requirements are a maximum response speed of the control systems and a high accuracy in balancing the control pulses at steady-state conditions, although they cannot be easily provided when interference is passed to the control signals.

DESCRIPTION OF THE PRIOR ART

Known in the art is a method for control of the static gate converter, whereby a high accuracy in balancing the control pulses can be achieved at steady-state conditions, with the control system response speed remaining high. The method consists in that the gate control angle varies with the control signal, a difference between the actual and desired gate control pulse phases is produced, the phase difference is converted to a voltage, and the phase of the respective gate control pulses is corrected depending on the resulting voltages so as to minimize the difference.

The resulting difference is applied to a control device input for alignment of the pulse phase so as to minimize the phase difference (cf. U.S. Pat. No. 3,582,755, and Swedish Pat. No. 334670).

The accurate balancing of the pulses results from variation of the spacing between consecutive pulses across the control device output, conversion of the spacing into voltages and matching them to the spacing in the form of a voltage proportionate to the ratio between the power system period duration and the converter pulse number.

The foregoing device comprises a phase-shifter and an associated automatic balancing unit serving to generate a pulse phase correcting signal. The automatic balancing unit incorporates differentiating networks wherein the pulse-position modulation unit output pulses are injected. Output pulses supplied from the networks through an OR element trigger two single flip-flop oscillators, one of them being used to produce short pulses, and the other one generating long pulses. The difference between the conversion period and the duration of the pulse shaped by the other flip-flop oscillator determines the permissible measuring range of the spacing difference.

The pulse of the first single flip-flop oscillator impressed upon an analog switch connects the sawtooth generator to a positive d-c voltage source, with the result that the generator output voltage drops to zero. On completion of the generator voltage drop pulse, the generator voltage starts increasing linearly, and at the instant before the successive drop, the generator voltage value corresponds to the spacing between the pulses. The above-mentioned elements constitute an assembly designed to convert the spacing to voltage, and to measure it.

A spacing selector assembly is essentially a potentiometer, the voltage of which is compared with the generator voltage across the adder. The voltage at the adder output, which is the sawtooth voltage biased by a value equal to the potentiometer output voltage, is sent to the storage circuit through an analog switch. The storage circuit records the spacing between the second single flip-flop oscillator pulses. The level of the sawtooth voltage bias, at the instant before the successive reset, is stored in the circuit. During the balanced condition, the stored voltage is zero. If the control pulses are out of balance, the voltage across the storage circuit is directly proportionate to the departure of spacing from the predetermined value.

During intervals between records, i.e. when the second single flip-flop oscillator pulse is applied, the voltage derived from the storage circuit output is sent to the generator of the appropriate balancing channel. The number of integrators is equal to the number of converter gates. The storage circuit is connected to the respective integrator by the analog switches controlled by simple analog elements. The analog switches at the integrator outputs shape a common correcting signal applied, as stated before, to the control device input to eliminate the unbalance of the control pulses.

To preclude apparatus errors, the storage circuit output and the sawtooth generator input employ a feedback coupling. The feedback circuit is closed during the time determined by the second single flip-flop oscillator pulse.

In order to eliminate the d-c component in the correcting signal and thereby to prevent shifts of the control characteristic of the control device, the signals picked off from the integrator outputs are algebraically summed, and the sum signal in the form of a common feedback signal is supplied to the inputs of all the integrators through similar RC networks.

However, when the power supply line frequency varies, the error signal is not accurate. To compensate for said component at the integrator inputs, the adder puts out a d-c signal. Owing to the spread in the resistor parameters in the RC networks, the integrators signals to compensate for said spread and, hence, for the unbalance. The pulse spacing will be absolutely equal only at the trimming point. To reduce the unbalance to tolerable values, the accuracy of the RC circuits must be high.

A disadvantage inherent in the foregoing device resides in poor interference immunity. The unbalance brought about by interference affecting the error signal at the storage circuit output varies directly as the product of the disturbance signal amplitude by the second single-flip-flop oscillator pulse duration, and is relatively high.

SUMMARY OF THE INVENTION

It is an object of the present invention to provide a method for control of the static valve converter, and an apparatus for its realization, whereby the control pulses are balanced to a high accuracy.

Another object of the invention is to improve the interference immunity of the static valve converter control device.

This object is accomplished by providing a method for control of the static gate converter, whereby the phase of the gate control pulses in the static gate converter is changed depending on the control signal, a difference between the actual and desired phases of the control pulses in each gate is determined, the difference is converted into a voltage, and the control pulse phase is corrected for the respective gates in proportion with the resulting voltages so as to reduce the phase difference. An equidistant pulse sequence is produced, according to the invention, with a frequency equal to the conversion frequency. The phase of the equidistance pulse sequence is adjusted so that the mean difference between the phases of the equidistant pulse sequence and the respective control pulses of all the valves is equal to zero. Then the pulse phase difference is determined for each individual valve.

In order that the mean difference in pulse phase be equal to zero, the voltages equivalent to said difference are summed in all phases, and the sum signal can be smoothed out, with the equidistant pulse sequence frequency varying directly with the resulting sum signal toward a minimum sum signal value.

It is expedient that the sum signal be initially smoothed out.

This object is also attained by an apparatus, in which the method for control of the static valve converter is realized, comprising a phase-shifter and an associated control pulse automatic balancing unit. The balancing unit, according to the invention, includes an equidistant pulse sequence assembly which includes a controlled pulse generator, a phase difference meter connected to the output of the pulse generator, and an error signal shaper whose inputs are connected to the phase difference meter outputs and whose output is connected through an adder and a low-pass filter to the controlled pulse generator input. The automatic balancing unit also comprises an element for shaping sequences of narrow pulses, the edges of which are aligned with the edges of the respective control pulses, the inputs of the shaping element being connected to respective outputs of the phase-shifter, and the output being applied to a second input of the phase difference meter. Also included are correcting signal circuits in a number equal to the numer of conversion phases, and connected to the error signal shaper output. Each correcting signal circuit incorporates a series-connected input analog switch, an integrator and an output analog switch, an output of the output analog switch in each correcting signal circuit being applied to a balancing input of the phase-shifter AND logical elements are provided in a number equal to the number of conversion phases, the inputs being connected to respective outputs of the phase shifter, and the outputs being applied to control inputs of the output analog switches of the correcting signal circuits of the appropriate conversion phases. Logical circuits are provided in a number equal to the number of conversion phases, each circuit including two logical AND elements and a logical OR element connected to the AND element outputs, an output of the logical OR element being connected to the correcting signal circuit of the appropriate conversion phase, first inputs of the logical AND elements being connected to respective outputs of the phase difference meter, second inputs being connected to the outputs of respective logical AND elements, and the outputs of the OR elements being connected to the control inputs of the input analog switches of the respective correcting signal circuits.

It is preferable that separate antiphase and interphase balancing be effected by a control pulse automatic balancing unit comprising an antiphase error signal converter, the inputs of which being connected to the phase difference meter outputs and to the phase-shifter outputs, and the output of which being applied to inputs of one set of the correcting signal circuits corresponding to either the even or the odd valves of the static gate converter, the inputs of all other correcting pulse circuits included into a second set being applied to the error signal shaper output. OR logical elements, the number of which being half the number of conversion phases, have inputs connected to the outputs of respective AND elements, and outputs connected to the control inputs of the output analog switches in the second set of the correcting signal circuits. The control inputs of the output analog switches in the first set of the correcting signal circuits are connected to the outputs of respective AND elements. An adder is provided having inputs applied to the correcting signal circuit outputs and an output applied to the phase-shifter input. Second inputs of the AND elements in the logical circuits are connected to the outputs of appropriate logical OR elements.

It is also preferable that the equidistant pulse sequence assembly be furnished with an adder, the inputs of which are applied to the outputs of the integrators in all the correcting signal circuits, and the output of which is applied to the input of the controlled pulse generator.

It is furthermore expedient that the adder output be connected to the controlled pulse generator input through a low-pass filter.

It is possible for the adder output to be connected to the low-pass filter input, and the inputs to be connected to the outputs of the integrators of all correcting signal circuits and to the output of the error signal shaper so as to establish an electric coupling between the shaper and the controlled pulse generator.

The apparatus of the present invention permits accurate balancing of the control pulses, and provides for a high interference immunity of the whole circuitry.

BRIEF DESCRIPTION OF THE DRAWINGS

These and other objects and advantages of the present invention will become more fully apparent from the following description of a preferred embodiment thereof taken in conjunction with the accompanying drawings, wherein:

FIG. 3 is a block diagram of an equidistant pulse sequence assembly, according to the invention;

FIGS. 4a, 4b, 4c, 4d, 4e, 4f, 4g, 4h, 4i, 4j, 4k, and 4l are time charts which illustrate operation of the apparatus shown in FIG. 1; and FIGS. 5a, 5b, 5c, 5d, 5e, 5f, 5g, 5h, 5i, 5j, 5k, 5l, 5m and 5n are time charts which illustrate operation of the apparatus shown in FIG. 2.

DETAILED DESCRIPTION OF THE INVENTION

Figure 1:
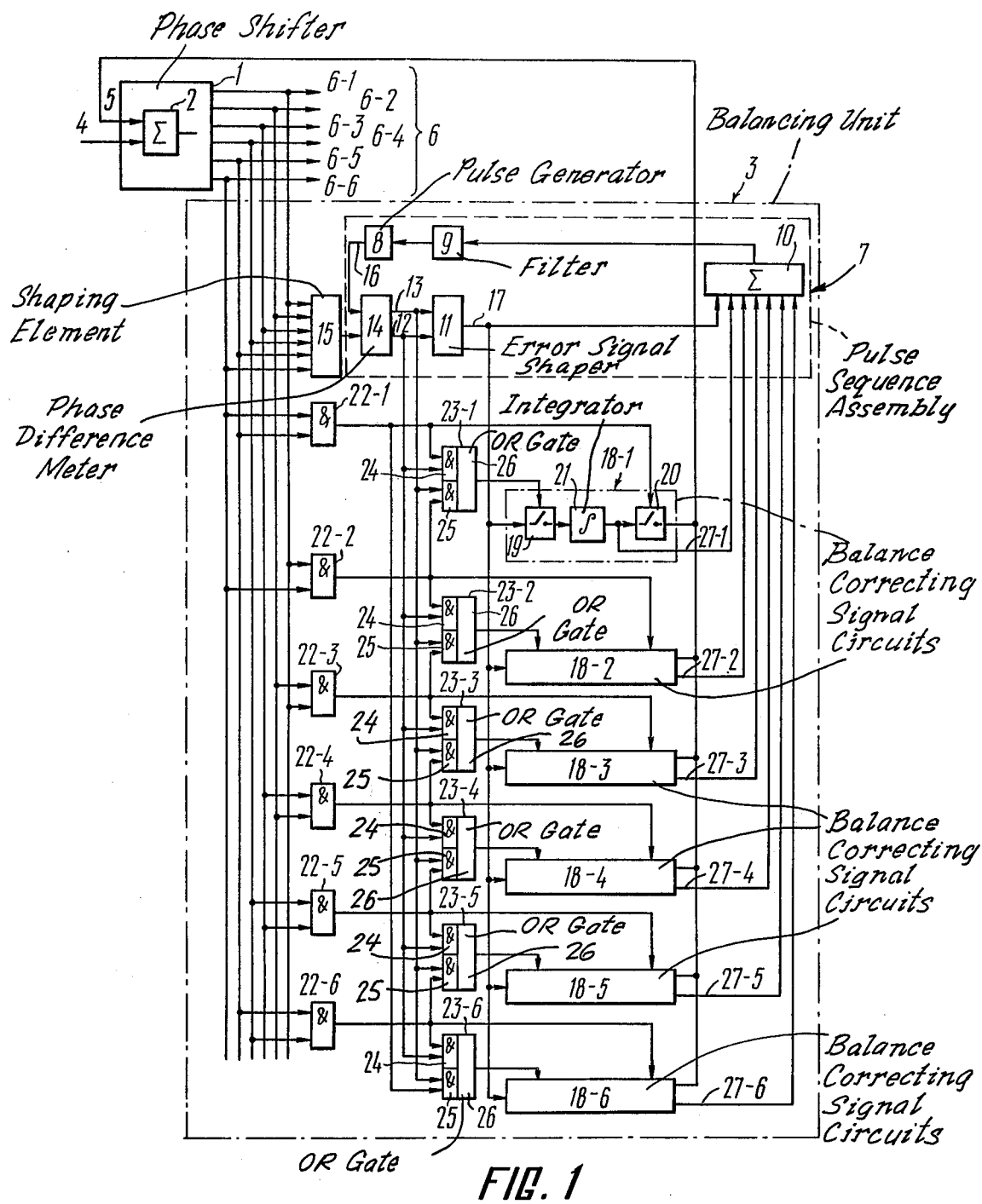
FIG. 1 is a block diagram of an apparatus for control of the static gate converter, with a common interphase and antiphase balancing system, according to the invention.

Referring to FIG. 1, the static valve converter control apparatus incorporating a common interphase and antiphase balancing system comprises a phase-shifter 1 serving to convert the control signal into the control pulse phase, with the construction principle and schematic diagram selected optionally, an adder 2, various models whereof are commonly included into devices of similar type, and a control pulse automatic balancing unit 3.

The control signal is applied to an input 4 of the unit 1, an input 5 is connected to an output of the unit 3, and outputs 6, the number of which is equal to the number of conversion phases and, in this particular case, is equal to six (6-1, 6-2, 6-3, 6-4, 6-5 and 6-6), are connected to inputs of the control signal automatic balancing unit 3. It is assumed that the duration of the control pulses is equivalent to 120 electrical degrees.

The control pulse automatic balancing unit 3 comprises an equidistant pulse sequence assembly 7 which constitutes one of the most essential components of the unit. The assembly includes an automatic frequency control system which comprises a controlled pulse generator 8 connected through a low-pass filter 9 to an output of an adder 10, one input of which is connected to an output of an error signal shaper 11, inputs of the shaper being connected respectively to outputs 12 and 13 of a phase difference meter 14. One input of the phase difference meter is applied to the generator 8, and the other is connected to a shaping element 15 which shapes sequences of short pulses, the edges of which are aligned with the edges of the respective control pulses, the inputs of the shaping element being connected to respective pulse outputs of the phase shifter 1.

The element 15 may, for example, be composed of a set of differentiating networks, wherein outputs are associated through an aggregate circuit (not shown in the drawing) or are hooked up in any other acceptable way. It should be noted that the single-channel control systems, such as that used in the phase-shifter 1, are commonly provided with an analogous pulse sequence output. In such cases it is expedient to connect said output to the appropriate input of the phase difference meter 14, and not to use the element 15 (said version is not presented in the drawing, since the functions are fulfilled by the unit 1).

The outputs 12 and 13 of the meter 14 generate a phase difference of pulses derived from an output 16 of the pulse generator 8 and control pulses derived from the output 6 in unit 1, with the phase difference given in the form of an error pulse duration.

The shaper 11 operating according to the adoped type of modulation produces an error signal at an output 17, which can most simply be shaped as pulses of opposite polarity and of a constant and equal amplitude, the duration of which being equal to that of the respective pulses at the outputs 12 and 13.

The output 17 of the error signal shaper 11 is connected to inputs of balance correcting signal circuits 18, each circuit comprising input and output analog switches 19 and 20, and an integrator 21. The correcting signal circuit employs the input of the switch 19 and the output of the switch 20 as the input and output thereof, respectively. The integrator 21 is inserted between the switches 19 and 20.

The number of circuits 18 is equal to the number of coverter gates, i.e., six in the given case (18-1, 18-2, 18-3, 18-4, 18-5 and 18-6). The outputs of all the circuits 18 are interconnected and are applied to the balancing input 5 of the adder 2.

The switches 19 permit the passage of the difference between a definite pair of pulses to the integrator 21 in the respective balancing channel, and inhibit the passage of the difference between other pairs of pulses.

The number of balancing channels is equal to the number of conversion phases. The function of analog switches 20 is to allow the correcting signal to affect only the phase of the control signal in the given channel, hence each switch is conducting only during the space between the preceding control pulse and the control pulse corresponding to the given channel. The switches 19 and 20 are correlated.

To control the analog switches 19 and 20, each balancing channel includes a logical AND element 22 (denoted 22-1, 22-2, 22-3, 22-4, 22-5 and 22-6 according to the channel). An output of each element 22 is connected to the control input of the switch 20 and to an input of a logical circuit 23 (denoted 23-1, 23-2, 23-3, 23-4, 23-5 and 23-6 according to the channel). The logical circuit comprises two logical AND elements 24 and 25, and a logical OR element 26 connected to outputs of the elements 24 and 25. An output of the OR element is applied to a control input of the switch 19. First inputs of the AND elements 24 and 25 in the logical circuit 23 are applied to the outputs 12 and 13, respectively, of the phase difference meter 14, and second inputs are applied to outputs of the respective AND element and of an AND element of a successive balancing channels.

The inputs in each logical AND element are connected to the outputs 6 of the phase-shifter 1, wherein the pulse sequence immediately precedes the pulse generated by the channel in question. Thus, the input of the element 22-1, in the first channel used for balancing the phase of the pulse across the output 6-1, is connected to the outputs 6-5 and 6-6; the input of the element 22-2, in the second channel used for balancing the pulse at the output 6-2, is connected to the outputs 6-6 and 6-1; and so on.

Outputs 27 (27-1, 27-2, 27-3, 27-4, 27-5 and 27-6) of the integrators 21 in the correcting signal circuits 18 are connected to respective inputs of the adder 10.

The apparatus under consideration also permits separate balancing of the antiphase and interphase pulses. Said balancing method greatly improves the performance of the converter control system. For example, when the converter operates under unbalanced conditions for a long time (as in the case with a single-phase or two-phase short circuit), the interphase balancing circuit is cut out, and the converter operates for a lighter duty. Therewith, the balancing of the antiphase pulses remains highly accurate. Besides, when an appropriate transfer constant is selected, the response speed of the antiphase balancing channels increases because the requirements of antiphase balancing are commonly more stringent than those to be satisfied by the interphase balancing system.

The interphase balancing is accomplished by selection of even or odd control channels which serve to exercise control of either even or odd gates in the gate converter. In this event, the supplementary channels effect the antiphase balancing. The integrators of the interphase balancing circuits are fed with the sum signal composed of the error signals corresponding to the given power supply line phase, the integrator output signal influencing the phase of both control phases in the given phase. The antiphase balancing converters respond to the differential signal composed of the error signals in the given phase, whereas the integrator signal affects the antiphase balancing channel pulse phase alone. For this purpose, the automatic balancing unit incorporates an antiphase error signal circuit and an extra adder, the functions of which may be fulfilled by the adder 2 if required.

Figure 2:
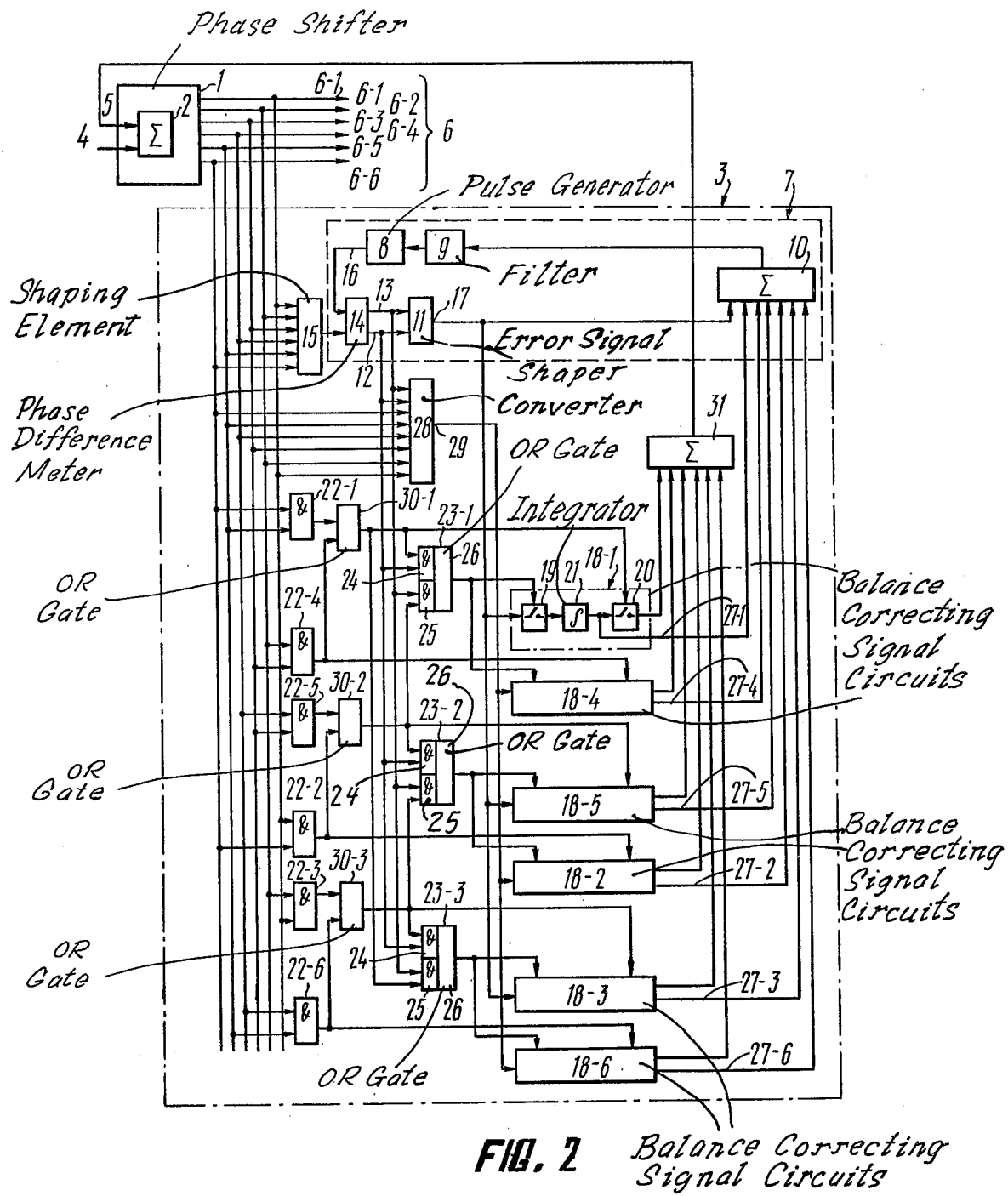
FIG. 2 is a block diagram of the same apparatus, with separate interphase and antiphase balancing systems, according to the invention.

The block diagram of said apparatus is presented in FIG. 2. The unit 3 includes an antiphase error signal converter 28, the inputs of which are connected to the outputs 12 and 13 of the meter 14 and to the outputs 6 of the phase shifter 1. An output of the converter 28 is associated with the inputs of the correcting signal circuits 18 serving for antiphase balancing. In the given case, the antiphase balancing is accomplished by the correcting signal circuits 18-2, 18-4 and 18-6 which are used to influence the control pulses of the even valves and are connected to the outputs 6-2, 6-4 and 6-6 in unit 1. The outputs of other circuits 18 are applied to the error signal shaper 11. The circuits 18-1, 18-3 and 18-5 effect the interphase balancing.

To control the analog switches 19 and 20, the correcting signal circuits 18 include logical OR elements 30, the number of which is equal to half the number of conversion phases. In the present case, three elements 30-1, 30-2 and 30-3 are provided, and the inputs thereof are connected to the outputs of the AND elements 22 of the respective power supply line phase, and the outputs thereof are connected to the inputs of the analog switches 20 in the interphase balancing correcting signal circuits 18.

The control inputs of the antiphase channel switches 20 are connected, like in the case before, to the outputs of the AND elements 22 included into the balancing in question. Suppose, in the given case the outputs 6-1 and 6-4 relate to the valves of the power line phase A, the outputs 6-3 and 6-6 relate to the valves of the phase B, and the outputs 6-5 and 6-2 are associated with the valves of the phase C. The switch 20 of the circuit 18-1 in the interphase balancing channel of the phase A is connected to the output of the element 30-1, and the similar switch 20 of the circuit 18-4 in the antiphase balancing channel is connected to the output of the AND element 22-4. The number of logical circuits 23 is half that of the balancing channels, and the outputs thereof are connected to the control inputs of the analog switches 19 of the correcting pulse circuits 18 of the respective phase. First inputs of the elements 24 and 25 in the logical circuit 23 are applied respectively to the outputs 12 and 13 of the phase difference meter 14, and second inputs thereof are applied to the outputs of the OR elements 30 of the own phase and of the phase of the pulses immediately following the pulses of the phase under consideration. For example, the second output of the AND element 25 in the phase A logical circuit 23-1 is connected to the output of the phase C logical OR-to-OR element 30-2 since the pulses derived from the phase C outputs 6-2 and 6-5 immediately follow the pulses supplied from the phase A outputs 6-1 and 6-4.

The outputs of the switches 20 in all the correcting signal circuits 18 are applied to the inputs of the extra adder 31 serving to produce a sum correcting signal of a stepped shape across the output 5.

FIG. 3 presents another embodiment of the equidistant pulse sequence assembly 7, wherein the error signal shaper 11 through the low-pass filter 9 and the adder 10 are connected to the inputs 32 and 33 of the pulse generator 8, respectively.

The adder 10 may also be connected to the generator input 33 through a low-pass filter 34.

The static gate converter control apparatus operates as follows.

The mean control pulse phase value (FIGS. 4a through 4f, and FIGS. 5a through 5f) in the phase shifting circuit depends on the d-c component of the control signal applied from the input 4. Owing to the apparatus errors and interference acting on the control signals, the control signals are out of balance. The inputs of the phase difference meter 14 are supplied with two pulse sequences, i.e., an equidistant pulse sequence (FIG. 4g and FIG. 5g) derived from the controlled pulse generator 8, and a short pulse sequence derived from the output of the element 15, with the pulse sequence edges aligned with those of the control pulses at the outputs 6 of the unit 1. It has been mentioned above that the outputs 12 and 13 determine the phase difference in the form of a pulse duration (FIG. 4, and FIGS. 5h and 5i). The error signal (FIG. 4 and FIG. 5j) supplied from the output of the shaper 11 is sent through the adder 10 and the low-pass filter 9 to the control input of the generator 8, whereby the generator pulse phase is caused to vary so as to reduce the signal level at the output and, hence, the mean error signal value to zero (FIG. 4 and FIG. 5j). Consequently, under steady-state conditions, the phase of the pulses produced by the generator 8 is equal to the mean value of control pulse phase.

The analog switches 19 distribute the difference in the above-mentioned pairs of pulses among the appropriate balancing correcting signal circuits. The integrators 21 generate the phase balance correcting signals (FIG. 4k), and the analog switches 20 activated at the instant of generation of the successive control pulse edge provide for connection of the output in the respective integrator to the balancing input 5 in the unit 1. The stepped balance correcting signal (FIG. 4l) across the input 5 corrects the control pulse phase at the outputs 6 and tends to minimize the difference between the control pulses and the respective pulses supplied by the generator 8. Under steady-state conditions, the given difference is zero, i.e., the leading edges of the control pulses are aligned with the leading edges of the equidistant sequence pulses and, hence, the control pulses are absolutely balanced.

The signals derived from the integrator outputs through the adder 10 and the low-pass filter 9 are forwarded into the generator 8. Thus, the d-c component in the sum correcting signal (FIG. 4l) which affects the control pulse mean phase value is eliminated. Should the transfer function of the low-pass filter 9 include an integral component, the automatic balancing unit 3 will not influence the control angle mean value even if the power line frequency departs from the assigned value. Thus, the circuitry of the automatic balancing unit 3 basically eliminates the d-c component in the correcting signal, and provides for balancing of the pulses for any steady-state conditions. The spread in the transfer factors of various channels of the adder 10 does not result in pulse unbalance because the spread effects are averaged.

In order to produce an equidistant pulse sequence, the frequency response of the continuous section in the open circuit of the phase-response automatic frequency control system must undergo attenuation for all the high-frequency components beginning with a frequency of 50 Hz. The degree of attenuation depends on the requirements to be satisfied by the automatic pulse balancing unit 3.

The novel control apparatus incorporates an automatic pulse balancing system which does not affect the control system response speed and, at the same time, permits elimination of the unbalance brought about by regular fluctuations in the control signal (occurring with a frequency multiple of the power line frequency).

By introducing appropriate constant shifts to the inputs of the integrators 21 and of the adder 10, it is possible to simplify measuring of the difference between the phases of the respective control pulses and the equidistant pulse sequence. In this case the equidistant pulse sequence phase is shifted in relation to the mean value of the control pulse phases by a value not exceeding the interval between the control pulses, and the difference pulses become unipolar. Thus, it is possible to simplify the phase difference meter 14, by making it, e.g., as a flip-flop, as well as the error signal shaper 11. It should be noted, however, that the accuracy and interference-resistance of the apparatus will be somewhat impaired.

The apparatus shown in FIG. 2 functions identically. The difference is that the correcting pulse circuits 18-1, 18-3 and 18-5 serving for interphase balancing receive the error signals (FIG. 5j) derived from the error signal shaper 11 in both channels corresponding to the given power line phase. The interphase balancing signal (FIG. 5l) supplied from the output of the integrator 21 controls the phase of both pulses of the given power line phase. For this purpose, the switches 20 are conductive twice during each period.

The integrator 21 included into the antiphase balance correcting signal circuits 18 generates a signal (FIG. 5m) proportionate to the integral of the difference between the error signals in the given power line phase. The signal is produced if the error signals (FIG. 5k) across the output 29 of the correcting signal circuit 28 correspond to the odd gates and have a polarity opposite to that of the same signals (FIG. 5j) across the output of the error signal shaper 11.

The antiphase balance correcting signal (FIG. 5m) added to the interphase balance correcting signal (FIG. 5n) forms a signal (FIG. 5n) which influences the even valve control pulse phase alone. For this purpose, the switch 20 included into the circuits 18-4, 18-2 and 18-6 is conductive only once during each period.

The apparatuses of the present invention provide for initial balancing in steady-state conditions irrespective of the amount of unbalance resulting from dissimilarities of the control channels, departures of the sync voltages in the phase-shifter, and regular interference components in the control signal. To meet these requirements it is commonly quite enough to provide for an operating range of ±5 electrical degrees in the automatic pulse balancing unit 3.

The balancing accuracy depends on the parameters of the integrators 21 included into the correcting signal circuits 18. In the apparatuses, wherein the proposed diagrams are realized, the departure of the pulse spacing from the rated value does not exceed 0.05 electrical degree under steady-state conditions.

Said balancing accuracy implied that the currents through the conversion transformer circuit windings are free from the d-c component, and the converter currents and voltages are free from noncanonical harmonics.

An important advantage of the apparatuses according to the present invention is that the use of highly-accurate and stable elements is not necessary, and accurate pulse balancing does not require adjustment during manufacture and service.

The herein-proposed method and apparatus make it possible to balance directly the moments of opening of the valves of the converter bridge, and the intervals therebetween, due to the nonidentify of the control pulse-passage channels may be different. To this end, it will be sufficient to shape a sequence of narrow pulses, the edges thereof coinciding with the moments of opening of the valves, and to feed it to the input of the phase difference meter 14.

What is claimed is:

1. A method for control of a static valve converter, comprising the steps of: varying a phase of control pulses of static gap converter gates according to a control signal; forming an equidistant pulse sequence at a frequency equal to a conversion frequency; selecting an equidistant pulse sequence phase so that the mean phase difference value of the equidistant pulse sequence and respective pulses of all the valves is equal to a constant value, not exceeding the interval between two successive control pulses; determining a pulse phase difference for each individual gate; converting the phase difference into a voltage; and correcting control phase angles of the respective valves proportionally with the resulting voltages so as to minimize said phase difference.

2. A method according to claim 1, further comprising the step of, for enhancing the interference-resistance, selecting the equidistant pulse sequence phase so that the mean difference between the equidistant pulse sequence and the respective control pulses of all valves is equal to zero.

3. A method as claimed in claim 1, further comprising the steps of reducing said mean difference of pulse phase value to zero by adding the voltages corresponding to said pulse difference in all phases; and varying the frequency of said equidistant pulse sequence directly as the resulting sum signals so as to minimize the resulting sum signals.

4. A method as claimed in claim 3, further comprising the step of initially smoothing out said sum signal.

5. An apparatus for control of a static gate converter, comprising: a phase shifter, for conversion of the control signal into the control pulse phase, including a control input to which control signals are applied, a balancing input and outputs equal in number to the number of conversion phases; and a control pulse automatic balancing unit associated with said phase shifter, said control pulse balancing unit comprising:

an equidistant pulse sequence assembly including a controlled pulse generator having an input and an output; a phase difference meter having a first input connected to said output of said controlled pulse generator, a second input and first and second outputs; a low-pass filter having an input and an output connected to the input of said controlled pulse generator; an error signal shaper having first and second inputs connected to respective outputs of said phase difference meter, and an output; and an adder having a first input connected to said output of said error signal shaper, a group of inputs, and an output connected to the input of said low-pass filters;

a shaping means, for shaping a sequence of narrow short pulses, the edges of which are aligned with those of the respective control pulses, having inputs, the number of which is equal to the number of conversion phases, and an output, said inputs of the shaping means being connected to respective outputs of said phase shifter, and said output of said shaping means being connected to said second input of said phase difference meter;

correcting signal circuits, the number of which being equal to the number of conversion phases, connected to said output of said error signal shaper, each correcting signal circuit including an input analog switch, an integrator and an output analog switch connected in series, an output of said output analog switch constituting an output of said correcting signal circuit and being connected to said balancing input of said phase shifter, an output of said integrator being connected to a respective input of said group of inputs of said adder, an input of said input analog switch being connected to said output of said error signal shaper;

logical AND elements, the number of which being equal to the number of conversion phases, each provided with inputs connected to respective outputs of said phase shifter, and an output connected to a control input of said output analog switch of the same conversion phase; and logical circuits, the number of which being equal to the number of conversion phases, each including two logical AND elements and a logic OR element connected to outputs of said logical AND elements, each logical AND element having first and second inputs, said first input being applied to one of said outputs of said phase difference meter, said second input of each first logical AND element being connected to an output of said logical AND element of the same conversion phase, and said second input of each second logical AND element being connected to an output of said logical AND element of the next conversion phase, said output of each logical OR element being connected to a control input of said input analog switch of the correcting signal circuit of the same conversion phase.

6. An apparatus for control of a static gate converter, comprising: a phase shifter, for conversion of the control signal into the control pulse phase, including a control input to which control signals are applied, a balancing input and outputs equal in number to the number of conversion phases; and a control pulse automatic balancing unit associated with said phase shifter, said control pulse balancing unit comprising:

an equidistant pulse sequence assembly including a controlled pulse generator having a first and second inputs and an output; a phase difference meter having a first input connected to said output of said controlled pulse generator, a second input and first and second outputs; a low-pass filter having an input and an output connected to said first input of said controlled pulse generator; an error signal shaper having first and second inputs connected to respective outputs of said phase difference meter, and an output connected to said input of said low-pass filter; and an adder having a group of inputs, and an output connected to said second input of said controlled pulse generator;

a shaping means, for shaping a sequence of narrow short pulses, the edges of which are aligned with those of the respective control pulses, having inputs, the number of which is equal to the number of conversion phases, and an output, said inputs of the shaping means being connected to respective outputs of said phase shifter, and said output of said shaping means being connected to said second input of said phase difference meter;

correcting signal circuits, the number of which being equal to the number of conversion phases, connected to said output of said error signal shaper, each correcting signal circuit including an input analog switch, an integrator and an output analog switch connected in series, an output of said output analog switch constituting an output of said correcting signal circuit and being connected to said balancing input of said phase shifter, an output of said integrator being connected to a respective input of said group of inputs of said adder, an input of said input analog switch being connected to said output of said error signal shaper;

logical AND elements, the number of which being equal to the number of conversion phases, each provided with inputs connected to respective outputs of said phase shifter, and an output connected to a control input of said output analog switch of the same conversion phase; and logical circuits, the number of which being equal to the number of conversion phases, each including two logical AND elements and a logical OR element connected to outputs of said logical AND elements, each logical AND element having first and second inputs, said first input being applied to one of said outputs of said phase difference meter, said second input of each first logical AND element being connected to an output of said logical AND element of the same conversion phase, and said second input of each second logical AND element being connected to an output of said logical AND element of the next conversion phase, said output of each logical OR element being connected to a control input of said input analog switch of the correcting signal circuit of the same conversion phase.

7. An apparatus as claimed in claim 6, wherein said equidistant pulse sequence assembly further includes a second low-pass filter having an input connected to said output of said adder, and an output connected to said second input of said controlled pulse generator.

8. An apparatus for control of a static gate converter, comprising: a phase shifter, for conversion of the control signal into the control pulse phase, including a control input to which control signals are applied, a balancing input and outputs equal in number to the number of conversion phases; and a control pulse automatic balancing unit associated with said phase shifter, said control pulse balancing unit comprising:

an equidistant pulse sequence assembly including a controlled pulse generator having an input and an output; a phase difference meter having a first input connected to said output of said controlled pulse generator, a second input and first and second outputs; a low-pass filter having an input and an output connected to the input of said controlled pulse generator; an error signal shaper having first and second inputs connected to respective outputs of said phase difference meter, and an output; and an adder having a first input connected to said output of said error signal shaper, a group of inputs, and an output connected to the input of said low-pass filters;

a shaping means, for shaping a sequence of narrow short pulses, the edges of which are aligned with those of the respective control pulses, having inputs, the number of which is equal to the number of conversion phases, and an output, said inputs of the shaping means being connected to respective outputs of said phase shifter, and said output of said shaping means being connected to said second input of said phase difference meter;

correcting signal circuits, the number of which being equal to the number of conversion phases, connected to said output of said error signal shaper, each correcting signal circuit including an input analog switch, an integrator and an output analog switch connected in series, an output of said integrator being connected to a respective input of said group of inputs of said adder, an input of said input analog switch of odd numbered correcting signal circuits being connected to said output of said error signal shaper;

a sum correcting signal adder having inputs connected to an output of said output analog switch of a respective correcting signal circuit, and an output connected to said balancing input of said phase shifter;

an anti-phase error signal converter having first and second inputs respectively connected to said first and second outputs of said phase difference meter, inputs connected to respective outputs of said phase shifter, and an output connected to an input of said input analog switch of even numbered correcting signal circuits;

logical AND elements, the number of which being equal to the number of conversion phases, each provided with inputs connected to respective outputs of said phase shifter, and an output, said output of even numbered AND elements being connected to a control input of said output analog switch of a respective correcting signal circuit;

logical OR elements, the number of which being equal to half the number of conversion phases, each logical OR element having inputs connected to said outputs of respective logical AND elements, and an output connected to a control input of said output analog switch of said odd numbered correcting signal circuits; and logical circuits, the number of which being equal to half the number of conversion phases, each including two logical AND elements and a logical OR element connected to outputs of said logical AND elements, each logical AND element having first and second inputs, said first input being applied to one of said outputs of said phase difference meter, said second input of each first logical AND element being connected to said output of a respective logical OR element, and said second input of each second logical AND element being connected to said output of a next in order logical OR element, and an output of said logical OR element being connected to a control input of said input analog switch of a respective correcting signal circuits.

9. An apparatus for control of the static gate converter, comprising: a phase shifter, for conversion of the control signal into the control pulse phase, including a control input to which control signals are applied, a balancing input and outputs equal in number to the number of conversion phases; and a control pulse automatic balancing unit associated with said phase shifter, said control pulse balancing unit comprising:

an equidistant pulse sequence assembly including a controlled pulse generator having first and second inputs and an output; a phase difference meter having a first input connected to said output of said controlled pulse generator, a second input and first and second outputs; a low-pass filter having an input and an output connected to said first input of said controlled pulse generator; an error signal shaper having first and second inputs connected to respective outputs of said phase difference meter, and an output connected to said input of said low-pass filter; and an adder having a group of inputs, and an output connected to said second input of said controlled pulse generator;

a shaping means, for shaping a sequence of narrow short pulses, the edges of which are aligned with those of the respective control pulses, having inputs, the number of which is equal to the number of conversion phases, and an output, said inputs of the shaping means being connected to respective outputs of said phase shifter, and said output of said shaping means being connected to said second input of said phase difference meter;

correcting signal circuits, the number of which being equal to the number of conversion phases, connected to said output of said error signal shaper, each correcting signal circuit including an input analog switch, an integrator and an output analog switch connected in series, an output of said integrator being connected to a respective input of said group of inputs of said adder, an input of said input analog switch of odd numbered correcting signal circuits being connected to said output of said error signal shaper;

a sum correcting signal adder having inputs connected to an output of said output analog switch of a respective correcting signal circuit, and an output connected to said balancing input of said phase shifter;

an anti-phase error signal converter having first and second inputs respectively connected to said first and second outputs of said phase difference meter, inputs connected to respective outputs of said phase shifter, and an output connected to an input of said input analog switch of even numbered correcting signal circuits;

logical AND elements, the number of which being equal to the number of conversion phases, each provided with inputs connected to respective outputs of said phase shifter, and an output, said output of even numbered AND elements being connected to a control input of said output analog switch of a respective correcting signal circuit;

logical OR elements, the number of which being equal to half the number of conversion phases, each logical OR element having inputs connected to said outputs of respective logical AND elements, and an output connected to a control input of said output analog switch of said odd numbered correcting signal circuits; and logical circuits, the number of which being equal to half the number of conversion phases, each including two logical AND elements and a logical OR element connected to outputs of said logical AND elements, each logical AND element having first and second inputs, said first input being applied to one of said outputs of said phase difference meter, said second input of each first logical AND element being connected to said output of a respective logical OR element, and said second input of each second logical AND element being connected to said output of a next in order logical OR element, and an output of said logical OR element being connected to a control input of said input analog switch of a respective correcting signal circuits.

10. An apparatus as claimed in claim 9, wherein said equidistant pulse sequence assembly further includes a second low-pass filter having an input connected to said output of said adder, and an output connected to said second input of said controlled pulse generator.

* * * * *